PARALLEL MAGNETIC COMPLEMENTERS

Filed March 30, 1955

INVENTOR
WILLIAM F. STEAGALL

BY Charles C. English
AGENT 2,820,151

PARALLEL MAGNETIC COMPLEMENTERS

William F. Steagall, Merchantville, N. J., assignor to Sperry Rand Corporation, Philadelphia, Pa., a corporation of Delaware Application March 30, 1955, Serial No. 497,981

18 Claims. (Cl. 307—88)

The present invention relates to magnetic amplifier circuits, and is more particularly concerned with parallel magnetic amplifier circuits capable of acting as complementers. In this respect it should be noted that a complementer is defined as an amplifier producing outputs in the absence of an input thereto; or on the contrary, one which produces no output when an input is in fact supplied.

Magnetic amplifiers are at present utilized in a great number of circuit configurations. A basic magnetic amplifier capable of such use is known as the parallel magnetic amplifier, and such an amplifier ordinarily comprises a core of magnetic material having a coil thereon energized by a source of regularly occurring power pulses and having a load effectively in parallel with the said coil. Means are further provided for determining the operating points of the said amplifier on the hysteresis loop of its core, whereby the said power pulses may effect relatively large or relatively small flux changes in the said core and the said coil will thereby exhibit relatively high or relatively low impedance values. In this respect, therefore, the load impedance may be coupled in parallel with the coil to which the power pulses are applied, or it may be coupled to a further coil on the amplifier core inductively coupled to the said power coil. In either event, a relatively large flux change in the core will produce a corresponding relatively large output across the said load impedance, while a relatively small flux change in the core will effect little if any output across the said impedance.

Parallel magnetic amplifiers of the type described may easily be arranged to exhibit non-complementing operation, wherein no output is produced in the absence of an input supplied thereto. When it is desired to effect complementing operation, however, means must be provided for subjecting the core to a supplemental magnetomotive force capable of regularly reverting the core to a predetermined operating point, whereby applied power pulses will effect a relatively large flux change in the core. This requirement of auxiliary magnetomotive forces has often complicated the structure of parallel magnetic amplifier complementers, increasing the cost of such complementers and rendering them more subject to operating failures.

The present invention serves to obviate these difficulties, and in particular, is concerned with a novel input circuit and energization source for providing complementing action in parallel magnetic amplifiers, in a simpler manner than has been the case heretofore.

It is accordingly an object of the present invention to provide an improved magnetic amplifier circuit.

Another object of the present invention resides in the provision of an improved complementer employing a parallel magnetic amplifier.

Still another object of the present invention resides in the provision of a parallel magnetic complementer which is more inexpensive, and less complex structurally, than has been the case heretofore.

Another object of the present invention resides in the provision of a novel input circuit for use in achieving complementing action in magnetic systems.

A still further object of the present invention resides in the provision of a parallel magnetic amplifier achieving complementing action and utilizing one, two or three coils on a magnetic core.

In achieving the foregoing objects and advantages, the present invention provides a complementer utilizing a core of magnetic material having at least one coil thereon. An input circuit is coupled to one end of the said coil for selectively causing current to flow through the said coil in opposite directions, in dependence upon the state of a pulse source coupled to the said input circuit. In particular, this input circuit may comprise a current source of fixed polarity and a further current source of variable polarity, and rectifier means are associated with each of the said current sources for coupling the said sources to one end of the amplifier coil, whereby the direction of current flow through the said coil is dependent upon the polarity of the said variable polarity source. If the said variable polarity source should comprise means providing regularly occurring positive and negative-going power pulses, the direction of current flow through the said amplifier coil is similarly regularly varied, whereby the core is caused to regularly traverse its hysteresis loop. Means are also provided for applying a controlling magnetomotive force to the core in response to signal inputs; and these means are designed to selectively oppose the action of power pulses of a predetermined polarity, whereby the core will be caused to remain at a given operating point, preparatory to reception of a power pulse of the other polarity. By the arrangement thus described, outputs are effected by the amplifier in the absence of a signal input and a signal input in turn inhibits such an output, whereby the amplifier acts as a complementer.

The foregoing objects, advantages, construction and operation of the present invention will become more readily apparent from the following description and accompanying drawings, in which.

Figures 1, 2, 3, 4, 5:
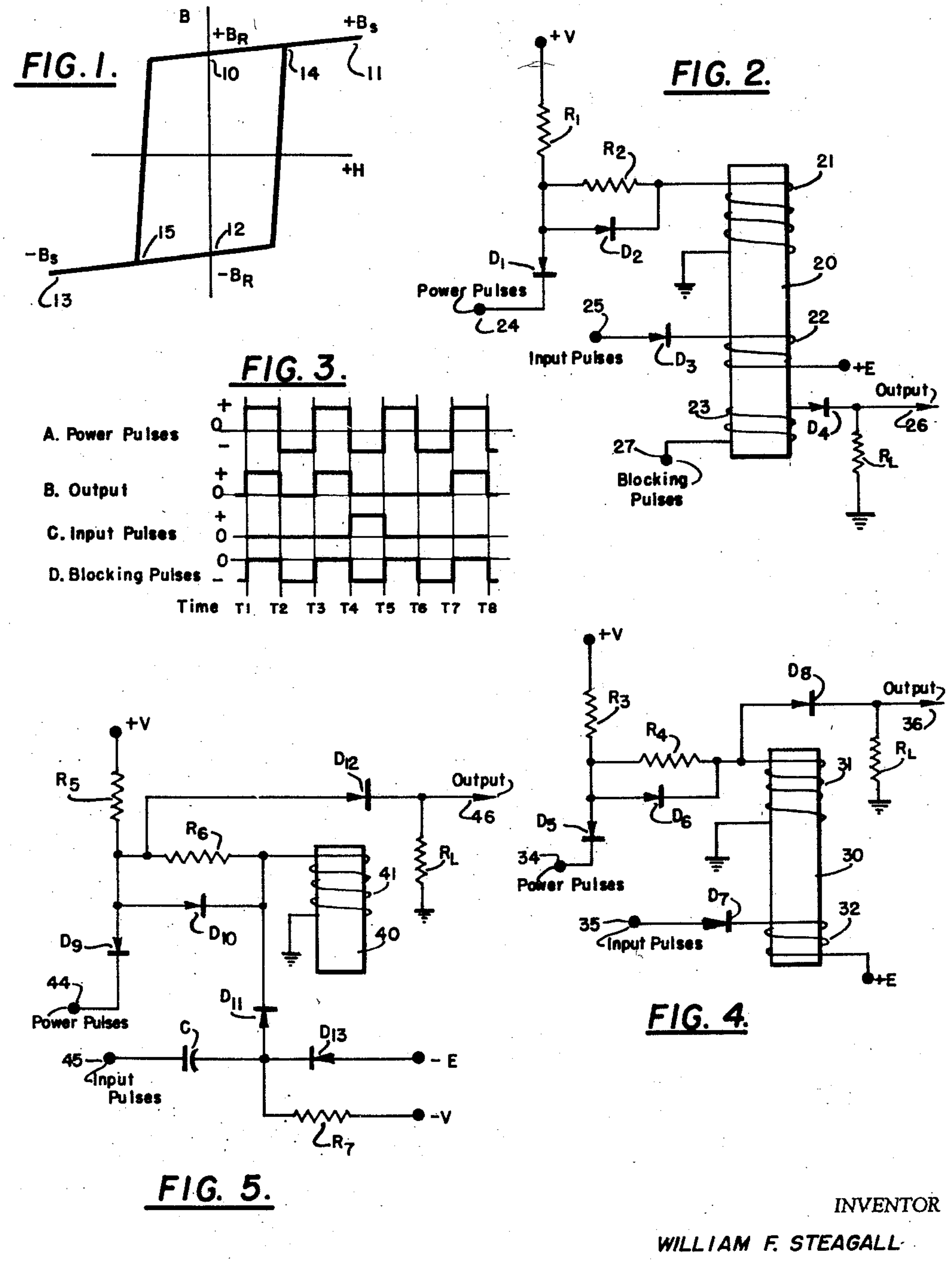
Figure 1 is an idealized hysteresis loop of a magnetic material which may preferably, but not necessarily, be utilized in the cores of magnetic amplifiers constructed in accordance with the present invention.
Figure 2 is a schematic diagram of a three-coil parallel magnetic complementer constructed in accordance with the present invention.
Figure 3 (A through D) are waveforms illustrating the operation of the several forms of the present invention.
Figure 4 is a further schematic diagram of a modified form of complementer in accordance with the present invention, employing only two coils.
Figure 5 is a schematic diagram of a still further modification of the present invention utilizing a single coil.

Referring now to the hysteresis loop shown in Figure 1, it will be seen that magnetic amplifiers or complementers constructed in accordance with the present invention may preferably, but not necessarily, utilize cores of magnetic materials exhibiting a substantially rectangular hysteresis loop. Such cores may be made of a variety of materials, among which are the various types of ferrites and various kind of magnetic tapes, including Orthonik and 4–79 Molypermalloy. These materials may in turn be given different heat treatments to effect different desired properties. In addition to the wide variety of materials applicable, the cores of the complementers to be discussed may be constructed in a number of different geometries, including both closed and open paths. For example, cup-shaped cores, strips of material, or toroidal cores may be utilized. It must be emphasized, however, that the present invention is not limited to any specific geometries of its cores nor to any specific hysteretic configuration therefor, and the examples to be given are illustrative only.

Returning to the hysteresis loop shown in Figure 1, it will be noted that the curve exhibits several significant points of operation, namely, point 10 (+B*r*) which represents a point of plus remanence; the point 11 (+B*s*) which represents plus saturation; the point 12 (—B*r*) which represents minus remanence; the point 13 (—B*s*) which represents minus saturation; the point 14 which represents the beginning of the plus saturation region; and the point 15 which represents the beginning of the minus saturation region.

Discussing for the moment the operation of a device utilizing a core which depicts a hysteresis loop such as has been shown in Figure 1, let us initially assume that a coil is wound on the said core. If the core should now initially be at its operating point 10 (plus remanence) and if the core should then be caused to move from the said operating point 10 to its operating point 11 (plus saturation), a relatively small flux change will be effected through the coil. Under this state of operation, if an output impedance should be coupled in parallel with the said coil, or if the said output impedance should be coupled across a further winding inductively coupled to the said coil, the realtively small flux change will effect a relatively small output across the said load impedance. On the other hand, if the core should initially be at its minus remanence operating point 12, and the core is then caused to move from its said operating point 12 to the region of plus saturation, preferably to the operating point 14, a relatively large flux change will be effected through the said coil and a relatively large output will appear across a load impedance connected in one of the manners described above.

When the foregoing operation is to be utilized in effecting a complementer, therefore, the magnetic core utilized should regularly be driven from its minus remanence operating point 12 to its plus remanence operating point 10 (preferably via the point 14), for each desired output; and should then be returned from the said plus remanence operating point 10 to the minus remanence operating point 12, preferably via the operating point 15, intermediate each desired output. Further, since complementing action is desired, the foregoing traverse of the core's hysteresis loop, from point 10 to point 12 via point 15, should be effected in the absence of input pulses and should be inhibited when an input is in fact supplied.

Complementers, operating in accordance with the preceding discussion, may take a number of differing forms; and these forms may in turn utilize different coil dispositions for effecting the disired operations. One form of parallel magnetic complementer, in accordance with the present invention, and utilizing the novel input circuit of the present invention, is shown in Figure 2. Thus, a parallel magnetic complementer may utilize a core 20 of magnetic material preferably, but not necessarily, exhibiting a substantially rectangular hysteresis loop of the type discussed in reference to Figure 1. The core 20 may carry a power winding 21, a signal or input winding 22 and an output winding 23 thereon. One end of the power winding 21 is returned to ground, as shown, and the other end of the said winding is coupled to a current source of fixed polartiy comprising a voltage source +V, and a relatively high impedance $R_1$, the said voltage source of fixed polarity being coupled, as shown, to the upper end of power winding 21 via a rectifier D2. A further energization source of variable potential is also coupled to the upper end of the said power winding 21 via a resistance R2 and a rectifier D1, and this source of variable polarity may in fact comprise a pulse source 24 coupled to the cathode of the rectifier D1 and having the pulse configuration shown in Figure 3A. One end of the signal or input winding 22 is coupled to a source of positive potential +E, and the other end of the said signal winding is coupled via a rectifier D3 to a source 25 of selective input pulses having the configuration shown in Figure 3C. The output winding 23 is also coupled at one of its ends via a rectifier D4 to an output point 26 whereby outputs selectively appear across a load impedance $R_L$; and the other end of the said output winding 23 is coupled to a source 27 of blocking pulses having the configuration shown in Figure 3D.

The operation of the complementer shown in Figure 2 will become readily apparent from a consideration of the waveforms of Figure 3. Thus, let us assume that the core 20 is initially at its minus remanence operating point 12. If a positive-going power pulse should now appear at the terminal 24 during the time interval *t1* to *t2*, the rectifier D1 will be rendered non-conductive and a current will flow from the constant polarity current source +V—$R_1$, via the rectifier D2, and thence through the winding 21 to ground. The current thus flowing through coil 21 during the time interval *t1* to *t2* subjects the core 20 to a +H magnetizing force, whereby the said core is driven from its minus remanence operating point 12 to its plus remanence operating point 10, preferably via the operating point 14 during the time interval *t1* to *t2*. A relatively large flux change is thus effected in the core 20, inducing potentials in both the windings 22 and 23. Current is prevented from flowing in the signal winding 22 due to the provision of rectifier D3, poled as shown. However, inasmuch as the blocking pulse applied to terminal 27 of the otuput winding 23 is at substantially ground potential during the time interval *t1* to *t2*, a substantial current will flow through the output winding 23 via the rectifier D4, whereby an output will appear at the terminal 26 across the load $R_L$.

At the time *t2*, the core 20 will be at its plus remanence operating point 10. If now the power pulse from source 24 should assume a negative polarity during the time interval *t2* to *t3*, the rectifier D1 will conduct, lowering the potential of the anode thereof substantially to that of the negatively applied power pulse and causing the rectifier D2 to be non-conductive. During the time interval *t2* to *t3*, a current will therefore flow from ground through the winding 21 and through the resistor R2 and the rectifier D1 to the terminal 24. It will be noted that this current flow during the time interval *t2* to *t3* is in a direction opposite to that effected through the coil 21 during the time interval *t1* to *t2*, whereby the core 20 is subjected to a —H magnetizing force during this time interval *t2* to *t3*, and the core 20 is flipped from its plus remanence operating point 10 to its minus remanence operating point 12, preferably via the operating point 15. While this action once more effects a relatively large flux change in the core 20, current is prevented from flowing in the signal winding 22 by the +E source coupled to one end of the said signal winding, and current is also prevented from flowing in the output winding 23 during this time interval because of the rectifier D4 coupled thereto. During a subsequent time interval *t3* to *t4*, therefore, the core 20 may once more be driven from its minus remanence operating point 12 to its plus remanence operating point 10 by the application of a positive-going power pulse at terminal 24, rendering the rectifier D1 non-conductive and permitting current flow via the rectifier D2 and winding 21 from the current source +V—$R_1$.

If now an input pulse should appear during a time interval *t4* to *t5* (Figure 3C), a current will be caused to flow through the rectifier D3 and the signal winding 22 to the source of positive potential +E. During this same time interval a negative-going power pulse is applied to the terminal 24, whereby, as was described previously, a current flows from ground through the winding 21, the resistor R2 and the rectifier D1, tending to revert the core 20 from its plus remanence operating point 10 to its minus remanence operating point 12. The core 20 is therefore, during the time interval $t4$ to $t5$, subjected to two magnetomotive forces of opposite polarity, whereby the effect of these two forces upon the core 20 is nullified. The source of negative-going blocking pulses coupled to terminal 27 (Figure 2D), serves to insure that any input signal, which is so large that it more than overcomes the reverting effect of the reverse current flow in winding 21 and thereby actually produces a positive magnetomotive force on core 20, is not connected to the load $R_L$ by induction. In many, perhaps most, instances the input signal will be smaller in magnitude than the foregoing, whereby the blocking pulse source would not be necessary and terminal 27 could be connected directly to ground.

Due to the foregoing action of the input signal during time interval $t4$ to $t5$, the core will remain at its plus remanence operating point 10. A further positive-going power pulse applied from the source 24 during the time interval $t5$ to $t6$ will, as before, render the rectifier D1 non-conductive and permit a current to flow from the $+V—R_1$ source via the rectifier D2 and winding 21, subjecting the core 20 to a +H magnetizing force. The core 20 will now be driven from its plus remanence operating point 10 to its plus saturation operating point 11, however, and a relatively small flux change will be effected in the core 20, whereby a relatively small output is induced in the output winding 23 and little if any usable output appears at the terminal 26.

During a time interval $t6$ to $t7$ the power pulse from source 24 once more assumes a negative polarity, whereby the rectifier D1 conducts, rendering the rectifier D2 non-conductive and permitting a reverse current flow through the winding 21 to flip the core 20 from its plus remanence operating point 10 to its minus remanence operating point 12. Thus, comparing the waveforms of Figures 3B and 3C, it will be seen that the circuit of Figure 2 produces regularly occurring outputs in coincidence with the application of positive-going power pulses at the terminal 24 and produces no output pulse in the time interval immediately subsequent to the application of an input pulse at terminal 25. The device thus acts as a complementer.

While the arrangement shown in Figure 2 employs three distinct windings on a magnetic core, it should be noted that such a winding configuration is by no means mandatory; thus, Figure 4 illustrates a parallel magnetic amplifier acting as a complementer and utilizing only two windings. In this respect a core 30 is provided, once more preferably, but not necessarily, exhibiting a hysteresis loop of the type shown in Figure 1; and the said core 30 may carry a power winding 31 and a signal or input winding 32 thereon. A current source of constant polarity is provided by the $+V—R_3$ configuration shown, and this current source is again coupled to one end of the power winding 31 by the rectifier D6. In addition, a source of variable polarity power pulses 34 is provided and this variable polarity power source is similarly coupled to one end of the winding 31 via the resistor R4 and rectifier D5. The selectively applied input pulses are coupled to a terminal 35 and thence via a rectifier D7 to the signal winding 32.

In these particulars, therefore, the circuit shown in Figure 4 is directly equivalent to that of Figure 2; and the various components will interact in the manner described previously when power pulses of the type shown in Figure 3A are applied from the source 34. The output winding utilized in the arrangement of Figure 2 is eliminated, however, by coupling the load impedance $R_L$ to one end of the power winding 31 by a rectifier D8, as shown, whereby signals selectively appear at the output point 36 in the manner shown by Figures 3A through 3C, inclusive. Thus, if we should assume that the core 30 is initially at its minus remanence operating point 12, a positive-going power pulse applied from the source 34 will once more render the rectifier D5 non-conductive, whereby a current will flow from the $+V—R_3$ source via the rectifier D6 through the winding 31 to ground. Inasmuch as a relatively large flux change is thus effected in the core 30, the potential across the coil 31 will be relatively high and this potential will in turn appear across the load $R_L$ via the rectifier D8. The application of a negative-going power pulse from the source 34 will once more cause the rectifier D5 to conduct, rendering the rectifier D6 non-conductive, and permitting a reverse current to flow from ground through the winding 31 and thence through the resistor R4 and rectifier D5, reverting core 30 to its $-Br$ point in the manner described previously. Similarly, an input pulse at terminal 35 will cause a current to flow in winding 32, nullifying the reverting magnetomotive force of the reverse current flow through winding 31, whereby the next subsequent positive-going power pulse will effect little if any potential across winding 31 and load $R_L$. The circuit thus acts as a complementer and produces output pulses at the terminal 36 in the absence of an input pulse at the terminal 35.

A still further modification of the present invention has been shown in Figure 5, and the arrangement there depicted achieves a complementer comprising a core of magnetic material 40 having only a single coil 41 thereon. Once more, a source 44 of positive and negative-going power pulses of the type shown in Figure 3A is supplied; and this source is selectively coupled to the upper end of the winding 44 by the resistor R6 and rectifier D9. In addition, a source $+V—R_5$ of constant polarity is provided, which source is coupled to the said upper end of the winding 41 via the rectifier D10. Outputs are caused to selectively appear, via a rectifier D12, across a load impedance $R_L$ at an output point 46, in a manner analogous to that described in reference to Figure 4. To eliminate the signal or input winding utilized in the arrangements of Figures 2 and 4, however, selectively applied input pulses appearing at the terminal 45 are coupled via a capacitor C to a rectifier D11, and are thence coupled to the upper end of the winding 41. A clamp circuit, comprising a rectifier D13 and a resistor R7, connected between sources of potential —E and —V, as shown, is also provided to maintain the rectifier D11 non-conductive in the absence of an input pulse.

It should be noted that operation of the circuit shown in Figure 5 is substantially in accord with that described for Figures 2 and 4, with the exception, however, that while an input pulse in the previously described arrangements produced a distinct magnetomotive force in opposition to that produced by current flow through the power winding, the arrangement of Figure 5 effects the desired nullification by applying a potential via the rectifier D11 to the upper end of winding 41, which is substantially equal and opposite to that produced by the power pulse source.

Thus, in the absence of input pulses, the alternately positive and negative-going power pulses from source 44 cause currents to flow via the rectifier D10 and winding 41 to ground, and from ground via the winding 41, resistor R6 and rectifier D9, in the manner described previously, whereby the core is regularly driven about its hysteresis loop producing successive output pulses at the terminal 46. If an input pulse should appear at the terminal 45 in coincidence with a negative-going power pulse, however, this pulse will be coupled via the capacitor C and rectifier D11 to the upper end of winding 41. The magnitude of pulse so applied via rectifier D11 to the upper end of winding 41 is sufficient to maintain the upper terminal of winding 41 at ground potential, and since the other terminal of winding 41 is also at ground potential, no current flows in winding 41. Upon application of an inut pulse at terminal 45, therefore, the core 40 will remain at its plus remanence operating point 10 and will be driven to its plus saturation operating point 11 during the next subsequent positive-going power pulse.

The circuit once more produces output pulses in the absence of input pulses, therefore, and inhibits an output pulse immediately subsequent to the application of an input pulse, whereby again the arrangement of Figure 5 acts as a complementer. It should be noted that the capacitor C and clamp circuit D13—R7 has been provided to permit input pulses having a base level of ground (Figure 3C), to be utilized. If the input or signal pulse configuration should be altered, however, so that the said input pulse is positive-going from a base level of —E, the capacitor C and the clamp circuit comprising rectifier D13 and resistor R7, may be eliminated, thus even further simplifying the circuit.

While I have described preferred embodiments of the present invention, it must be understood that the foregoing description is meant to be merely illustrative and not limitative of my invention. Many variations will be suggested to those skilled in the art and all such variations as are in accord with the principles of the present invention are meant to be included within the scope of the appended claims.

Having thus described my invention, I claim:

1. A magnetic amplifier comprising a core of magnetic material having a coil wound thereon, a source of regularly occurring positive and negative-going power pulses, a current source coupled to said coil, rectifier means coupling said source of power pulses to said coil whereby when said power pulses are of one polarity said rectifier means is non-conductive and current flows from said current source through said coil in a first direction, and when said power pulses are of the other polarity said rectifier means conducts and current flows through said coil and said rectifier means in a second direction opposite to said first direction, and means selectively applying a magnetomotive force to said core in a direction opposing that effected by said current flow in said second direction.

2. The amplifier of claim 1 wherein said last named means comprises a further coil on said core, and a source of selective signal pulses coupled to said further coil.

3. The amplifier of claim 1 wherein said last named means comprises a source of selective signal pulses, and further rectifier means coupling said source of selective signal pulses to said coil.

4. The amplifier of claim 1 including an output winding on said core inductively coupled to said coil, and load means coupled to said output winding.

5. The amplifier of claim 1 including load means coupled to said coil.

6. The amplifier of claim 5 wherein said load means is connected in parallel with said coil.

7. A magnetic amplifier comprising a core of magnetic material having a coil wound thereon, a current source coupled to one end of said coil, a source of positive and negative-going power pulses, rectifier means coupling said pulse source to said one end of said coil, means coupling the other end of said coil to a source of reference potential whereby the direction of current flow through said coil reverses with reversals in polarity of said power pulses, and control means for selectively applying a magnetomotive force to said core in opposition to and simultaneously with that effected by current flow through said coil and in the forward direction through said rectifier means.

8. The amplifier of claim 7 wherein said core comprises a magnetic material exhibiting a substantially rectangular hysteresis loop.

9. A magnetic amplifier comprising a core of magnetic material having a coil thereon, a current source, first rectifier means coupling said current source to one end of said coil, a source of positive and negative-going power pulses, second rectifier means coupling said pulse source to said first rectifier means and to said one end of said coil whereby when said power pulses are of one polarity said first rectifier means is conductive and said second rectifier means is non-conductive, and when said power pulses are of the other polarity said second rectifier means is conductive and said first rectifier means is non-conductive thereby to vary the potential of said one end of said coil between first and second predetermined magnitudes, means coupling the other end of said coil to a point of potential intermediate said first and second magnitudes, and input coil means for applying magnetizing forces to said core that tend to oppose those produced when said second rectifier means is conductive.

10. The magnetic amplifier of claim 9 including an output winding on said core inductively coupled to said coil, and load means coupled to said output winding.

11. A magnetic amplifier comprising a core of magnetic material having a winding thereon, first rectifier means, a first impedance, a current source coupled to one end of said coil by said first impedance and rectifier means in series, a source of positive and negative-going power pulses, means comprising a second impedance and second rectifier means connected in series with one another for selectively coupling said pulse source to said one end of said coil, said first impedance and said second rectifier means being connected in series between said sources, said second impedance being connected in parallel with said first rectifier means between said one coil end and the junction of said first impedance and said second rectifier means, and means coupling the other end of said coil to a point of substantially ground potential.

12. The magnetic amplifier of claim 11 wherein said first and second rectifier means are oppositely poled with respect to said one end of said coil.

13. The magnetic amplifier of claim 11 including load means coupled in parallel with said coil.

14. The magnetic amplifier of claim 11 wherein said core comprises a magnetic material exhibiting a substantially rectangular hysteresis loop.

15. A magnetic amplifier comprising a core of magnetic material having a coil thereon, a first current source of fixed polarity, a second current source of varying polarity, first rectifier means and first impedance means coupling said first source to one end of said coil, second rectifier means and second impedance means coupling said second source to said first rectifier and impedance means and to said one end of said coil with said first rectifier means and second impedance means being connected in a parallel combination between said one coil and a junction of said first impedance means and said second rectifier means, whereby changes in the polarity of said second source effect corresponding changes in the conductivity of said first and second rectifier means, said first and second rectifiers being oppositely poled with respect to said one end of said coil whereby one only of said rectifiers is conductive for a given polarity of said second source, and means coupling the other end of said coil to a point of substantially ground potential.

16. The magnetic amplifier of claim 15 including second and third coils on said core, a source of selective input signals coupled to said second coil, and a load impedance coupled to said third coil.

17. The magnetic amplifier of claim 15 including a load impedance coupled to said coil, a signal winding on said core, and a source of selective signal pulses coupled to said signal winding.

18. The magnetic amplifier of claim 15 including a load impedance selectively connected in parallel with said coil, and a source of selective signal inputs coupled to said one end of said coil.

References Cited in the file of this patent

UNITED STATES PATENTS 2,709,225 Pressman ------------- May 24, 1955

OTHER REFERENCES

Publication: "Testing Magnetic Decision Elements," by John D. Goodell, Electronics, January 1954, pp. 200, 202, and 203.